(12) United States Patent
Peterson et al.

(10) Patent No.: US 12,086,980 B2
(45) Date of Patent: Sep. 10, 2024

(54) PULMONARY ANALYSIS USING TRANSPULMONARY PRESSURE

(71) Applicant: Vida Diagnostics, Inc., Coralville, IA (US)

(72) Inventors: Samuel Peterson, Topanga, CA (US); Juerg Tschirren, Iowa City, IA (US); Xia Huang, North Liberty, IA (US); John D. Newell, Jr., Port Townsend, WA (US)

(73) Assignee: VIDA Diagnostics, Inc., Coralville, IA (US)

( * ) Notice: Subject to any disclaimer, the term of this patent is extended or adjusted under 35 U.S.C. 154(b) by 408 days.

(21) Appl. No.: 17/512,604

(22) Filed: Oct. 27, 2021

(65) Prior Publication Data
US 2022/0130040 A1   Apr. 28, 2022

Related U.S. Application Data

(60) Provisional application No. 63/106,345, filed on Oct. 27, 2020.

(51) Int. Cl.
*G06T 7/00* (2017.01)
*G06T 7/62* (2017.01)

(52) U.S. Cl.
CPC .............. *G06T 7/0012* (2013.01); *G06T 7/62* (2017.01); *G06T 2207/10081* (2013.01); *G06T 2207/30064* (2013.01); *G06T 2207/30104* (2013.01)

(58) Field of Classification Search
None
See application file for complete search history.

(56) References Cited

U.S. PATENT DOCUMENTS

2013/0174846 A1* 7/2013 Stenqvist ............... A61B 5/085
128/204.23

OTHER PUBLICATIONS

Dirksen, "Monitoring the Progress of Emphysema by Repeat Computed Tomography Scans with Focus on Noise Reduction," Proceedings of the American Thoracic Society, vol. 5, 2008, pp. 925-928.

Galban et al., "CT-based Biomarker Provides Unique Signature for Diagnosis of COPD Phenotypes and Disease Progression," Nature Medicine, vol. 18, No. 11, Nov. 2012, pp. 1711-1715.

Kirby et al., "A Novel Method of Estimating Small Airway Disease Using Inspiratory-to-Expiratory Computed Tomography," Respiration, vol. 94, 2017, pp. 336-345.

* cited by examiner

*Primary Examiner* — Leon Flores
(74) *Attorney, Agent, or Firm* — Fredrikson & Byron, P.A.

(57) ABSTRACT

A method for analyzing a patient based on a volumetric pulmonary scan includes receiving volumetric pulmonary scan data representative of a patient's pulmonary structure. This method also includes determining a level of transpulmonary pressure defining an effort metric based on one or more characteristics from the received volumetric pulmonary scan data. This method further includes determining one or more physiological or anatomical parameters associated with the transpulmonary pressure based on the received volumetric pulmonary scan data and the effort metric. A non-transitory computer readable medium can be programmed with instructions for causing one or more processors to perform the method for analyzing a patient based on a volumetric pulmonary scan.

31 Claims, 15 Drawing Sheets

| Disease Quantification Type | Desired Scan Phase | Conventional CT Disease Threshold | TPP Assessment | Threshold Adjustment Required |
|---|---|---|---|---|
| Emphysema | TLC | ≤ -950 HU | Sub-maximal inspiration | Increase |
| Air Trapping | RV | ≤ -856 HU | Sub-maximal expiration | Decrease |
| Fibrosis | TLC | ≥ -600 HU | Sub-maximal inspiration | Increase |

FIG. 7

PULMONARY ANALYSIS USING TRANSPULMONARY PRESSURE

CROSS REFERENCE TO RELATED APPLICATION

This application claims the benefit of U.S. Provisional Application No. 63/106,345, filed Oct. 27, 2020, the content of which is hereby incorporated by reference in its entirety.

BACKGROUND

The phenomenon of respiration is fundamentally governed by modulations in net pressure acting on the lungs. The two primary pressure forces involved are the internally induced intrapleural pressure and the externally induced atmospheric pressure. The difference between the intrapleural pressure and the ambient atmospheric pressure within the trachea and conducting airway of the lungs is called the transpulmonary pressure gradient. In humans, the muscles of respiration create periodic increases and decreases in intrapleural pressure that create a negative transpulmonary pressure on inspiration and a positive transpulmonary pressure on expiration. During the dynamic breath cycle, the various tissues and airspaces of the lungs respond in different ways to the transpulmonary pressure modulation.

When diagnosing or assessing lung disease, it is typically desirable to quantify aspects of one or more of those tissues and/or airspaces based on some measurable snapshot(s) taken at one or more instants in time, for example, using computed tomography (CT). Some quantifications assume that scans for acquiring the analyzed data (e.g., CT scan data) has been acquired at full inspiration or full expiration.

SUMMARY

Sometimes data is acquired at an intermediate state between full inspiration or full expiration. To make certain quantifications of lung tissues and/or airspaces meaningful, it can be useful to understand the state of transpulmonary pressure during which those one or more snapshots were acquired and to match that with the associated physiological impacts on the tissues and/or airspaces of interest.

In one embodiment of the present disclosure, a method for analyzing a patient based on volumetric pulmonary scan is disclosed. The method can include receiving a volumetric pulmonary scan data representative of a patient's pulmonary structure. The method can further include determining a level of transpulmonary pressure defining an effort metric based on one or more characteristics from the received volumetric pulmonary scan data. The method can also include determining one or more physiological or anatomical parameters associated with the transpulmonary pressure based on the received volumetric pulmonary scan data and the effort metric.

In a further embodiment of the above method, the method can include processing the received volumetric pulmonary scan data to identify one or more anatomical structures within the volumetric pulmonary scan data. The method can also include analyzing a shape of the one or more identified anatomical structures. In the embodiment of the method, the one or more characteristics from the received volumetric pulmonary scan data comprises the shape of the one or more anatomical structures. Further, in the embodiment of the method, determining the level of transpulmonary pressure defining the effort metric comprises analyzing a shape of one or more anatomical structures in the volumetric pulmonary scan data such that the effort metric is based on the shape of the one or more anatomical structures.

In a further embodiment of the above method, the one or more identified anatomical structures can comprise a trachea and the determining the level of transpulmonary pressure defining the effort metric can comprise analyzing the shape of the trachea in the volumetric pulmonary scan data.

In a further embodiment of the above method, the determining one or more physiological or anatomical parameters based on the received volumetric pulmonary scan data and the effort metric comprises comparing the received volumetric pulmonary scan data and the effort metric to a database. Further, the one more physiological or anatomical parameters comprises lung texture and the databased comprises a texture database.

In a further embodiment of the above method, the determining the level of transpulmonary pressure defining the effort metric comprises categorizing the volumetric pulmonary scan into one of a plurality of effort categories.

In a further embodiment of the above method, the method can include determining a transpulmonary pressure value associated with the received volumetric pulmonary scan data. Additionally, the determining the level of transpulmonary pressure defining the effort metric can include receiving a pressure measurement representative of an intrapleural pressure corresponding to the received volumetric pulmonary scan data. Further, the determining the transpulmonary pressure value can be based on the received pressure measurement.

In another embodiment of the present disclosure, a non-transitory computer readable medium programmed with instructions for causing one or more processors to perform a method for analyzing a patient based on a volumetric pulmonary scan is disclosed. The method performed by the one or more processors can include receiving volumetric pulmonary scan data representative of a patient's pulmonary structure. The method can also include determining a level of transpulmonary pressure defining an effort metric based on one or more characteristics from the received volumetric pulmonary scan data. The method can further include determining one or more physiological or anatomical parameters associated with the transpulmonary pressure based on the received volumetric pulmonary scan data and the effort metric.

In a further embodiment of the above method, the one or more identified anatomical structures includes a trachea and the determining the level of transpulmonary pressure defining the effort metric comprises analyzing the shape of the trachea in the volumetric pulmonary scan data.

In a further embodiment of the above method, the one or more anatomical structures comprises a diaphragm.

In a further embodiment of the above method, the determining one or more physiological or anatomical parameters based on the received volumetric pulmonary scan data and the effort metric can include determining one or more physiological or anatomical parameters based on the received volumetric pulmonary scan data and adjusting the one or more physiological or anatomical parameters based on the effort metric.

In a further embodiment of the above method, the one or more physiological or anatomical parameters comprises lung density.

In a further embodiment of the above method, the adjusting the one or more physiological or anatomical parameters is additionally based on the anatomical location of the one or more physiological or anatomical parameters. In the embodiment, the anatomical location can include a first lobe of a lung. Further in the embodiment, adjusting the one or more physiological or anatomical parameters is based on whether the first lobe is an upper lobe, a middle lobe, or a lower lobe.

In a further embodiment of the above method, the adjusting the one or more physiological or anatomical parameters based on the effort metric can include shifting a density value at each of a plurality of voxels according to the effort metric.

In a further embodiment of the above method, the adjusting the one or more physiological or anatomical parameters based on the effort metric can include determining a density histogram based on the volumetric pulmonary scan data and shifting the density histogram to map density values based on the effort metric.

In a further embodiment of the above method, the adjusting the one or more physiological or anatomical parameters based on the effort metric can further include determining a density histogram characteristic based on the volumetric pulmonary scan data. Additionally, in the embodiment the shifting the density histogram characteristic to map density values based on the effort metric can further include shifting the density histogram characteristic.

In a further embodiment of the above method, the determining the density histogram characteristic comprises determining a perc-15 measurement and the shifting the density histogram comprises adjusting the perc-15 measurement based on the effort metric.

In a further embodiment of the above method, the determining one or more physiological or anatomical parameters based on the received volumetric pulmonary scan data and the effort metric can include comparing the received volumetric pulmonary scan data and the effort metric to a database.

In a further embodiment of the above method, the one or more physiological or anatomical parameters can include lung texture and the database can include a texture database.

In a further embodiment of the above method, the database can include at least one model of volumetric pulmonary scan data and the volumetric pulmonary scan data can include volumetric pulmonary scan data of the patient during inspiration. Further, the at least one model can include baseline values associated with a full inspiration. Additionally, in the method, comparing the received volumetric pulmonary scan data and the effort metric to the at least one model can include shifting the baseline values of the at least one model based on the effort metric and comparing the received volumetric pulmonary scan data to the shifted baseline values.

In a further embodiment of the above method, the database comprises at least one model of volumetric pulmonary scan data and the volumetric pulmonary scan data comprises volumetric pulmonary scan data of the patient during expiration. Further, the at least one model comprises baseline values associated with a full expiration. Additionally, in the method, comparing the received volumetric pulmonary scan data and the effort metric to the at least one model can include shifting the baseline values of the at least one model based on the effort metric and comparing the received volumetric pulmonary scan data to the shifted baseline values.

In a further embodiment of the above method, the database can include at least one threshold value and the determining one or more physiological or anatomical parameters based on the received volumetric pulmonary scan data and the effort metric can include comparing volumetric pulmonary scan data to the at least one threshold value.

In a further embodiment of the above method, the at least one threshold value is based on the effort metric.

In a further embodiment of the above method, the determining one or more physiological or anatomical parameters based on the received volumetric pulmonary scan data and the effort metric can include, for each of one or more locations within the volumetric pulmonary scan data, comparing volumetric pulmonary scan data to a threshold value to determine whether a condition is present at such location.

In a further embodiment of the above method, the threshold value is adjusted from a baseline threshold value based on the effort metric.

In a further embodiment of the above method, the one or more physiological or anatomical parameters can include blood flow, artery size, vein size, heart size, lung nodule size, or muscle mass.

In a further embodiment of the above method, the determining the level of transpulmonary pressure defining the effort metric can include categorizing the volumetric pulmonary scan into one of a plurality of effort categories.

In a further embodiment of the above method, the plurality of effort categories comprises at least five effort categories.

In a further embodiment of the above method, the volumetric pulmonary scan data comprises CT scan data.

In a further embodiment of the above method, the receiving the volumetric pulmonary scan data representative of the patient's pulmonary structure can include receiving a first set of volumetric pulmonary scan data and a second set of volumetric pulmonary scan data, each set containing volumetric scan data representing a pulmonary nodule. Further, the determining the level of transpulmonary pressure defining the effort metric can include determining a first level of transpulmonary pressure defining a first effort metric associated with the first set of volumetric pulmonary scan data and a second level of transpulmonary pressure defining a second effort metric associated with the second set of volumetric pulmonary scan data. Additionally, in the method, the determining the one or more physiological or anatomical parameters can include determining a first size of the pulmonary nodule in the first set of volumetric pulmonary scan data and determining a second size of the pulmonary nodule in the second set of volumetric pulmonary scan data. Furthermore, the determining the one or more physiological or anatomical parameters can include determining a size difference of the pulmonary nodule based on the determined first size and the determined second size and characterizing the size difference of the pulmonary nodule based on the determined size difference, the first effort metric, and the second effort metric.

In a further embodiment of the above method, the method can include determining a transpulmonary pressure value associated with the received volumetric pulmonary scan data.

In a further embodiment of the above method, the determining the level of transpulmonary pressure defining the effort metric can include receiving a pressure measurement representative of an intrapleural pressure corresponding to the received volumetric pulmonary scan data. Further, the determining the transpulmonary pressure value can be based on the received pressure measurement.

In a further embodiment of the above method, the determining the transpulmonary pressure value is based on a ratio of total lung volume to total lung surface area, a ratio of the cubic root of the total lung volume and the square root of lung surface area, or a ratio of an intrapleural pressure and atmospheric pressure.

BRIEF DESCRIPTION OF THE DRAWINGS

FIG. 7 provides various examples of how conventional threshold may be adjusted to account for sub-optimal levels of transpulmonary pressure.

DETAILED DESCRIPTION

Figure 1A:
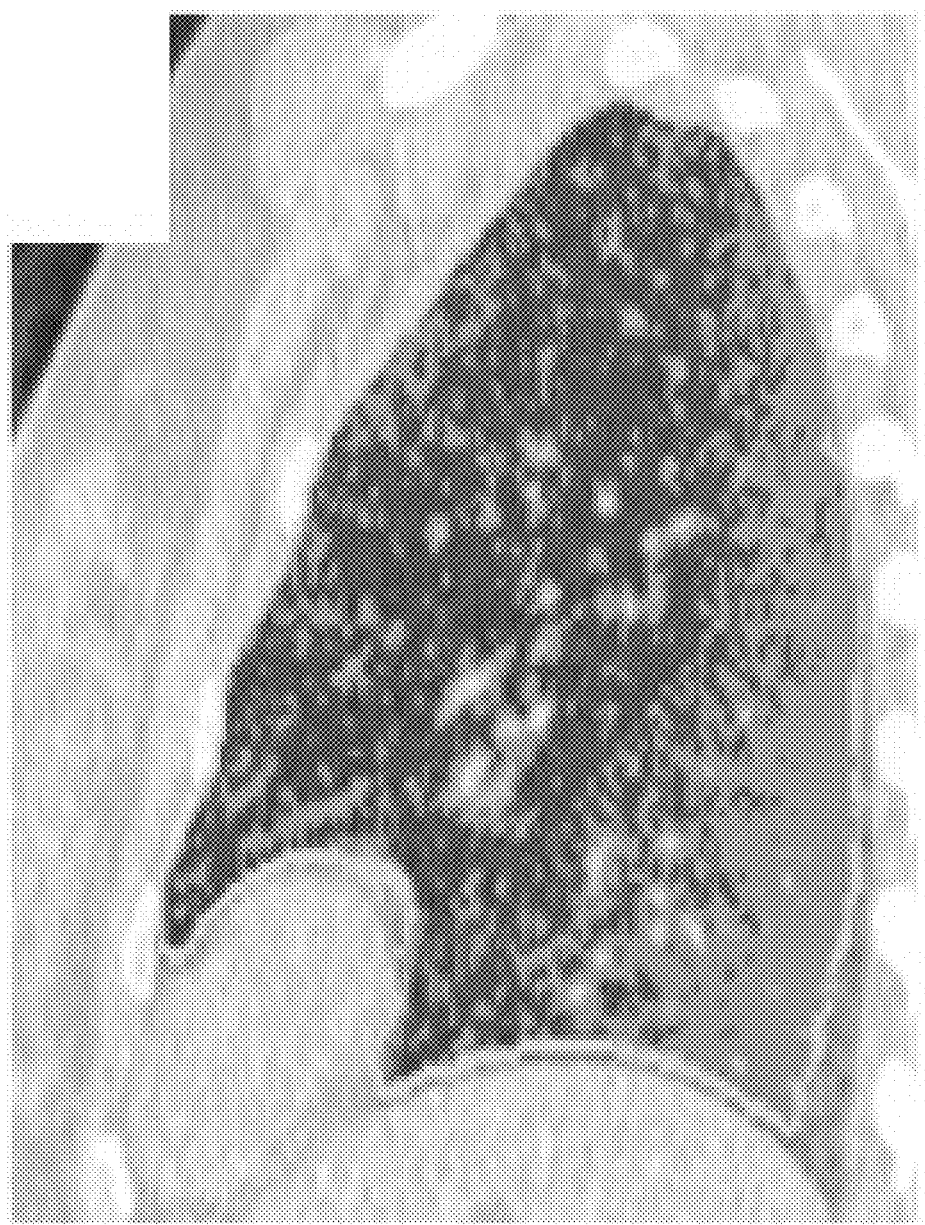
FIGS. 1A-C provide various examples of volumetric density threshold analyses for various disease characteristics.

The phenomenon of respiration is generally governed by modulations in net pressure acting on the lungs. Two of the primary pressure forces involved are the internally induced "intrapleural pressure" and the externally induced atmospheric pressure. The difference between the intrapleural pressure and the ambient atmospheric pressure within the trachea and conducting airway of the lungs is called the "transpulmonary pressure gradient." In humans, the muscles of respiration can create periodic increases and decreases in intrapleural pressure. This can create differences in transpulmonary pressure (TPP), such as negative TPP on inspiration and a positive TPP on expiration. During a dynamic breath cycle, the various tissues and airspaces of the lungs may respond in different ways to the TPP modulation.

In some instances, aspects of tissues and/or airspaces of interest on or near the lungs can be quantified based on one or more scans taken at one or more points in time, and such quantifications may provide diagnoses or assessment of lung disease. However, in some cases, the TPP values at the point in time of such scans may impact the quantified aspects of tissues and/or airspaces. Some embodiments of the present disclosure are related to quantifying aspects of one or more of the tissues and/or airspaces of interest based on the state of TPP during which those one or more scans were acquired. Additionally or alternatively, the state of TPP may be matched with one or more associated physiological impacts on the tissues and/or airspaces of interest.

As a first example, many diseases that affect the lungs can directly impact the density of the lung parenchymal tissue and its response to the range of positive and negative TPPs (e.g. expiration and inspiration). In the case of chronic obstructive pulmonary disorder (COPD), the parenchymal density tends to systematically decrease, while the opposite effect is observed for interstitial lung disease (ILD). Quantification of these types of diseases may involve directly measuring the density or density characteristics of the parenchyma throughout the lungs. Such density measurements can be performed using a volumetric medical scanning device (e.g. computed tomography or the like).

In some embodiments, a scan may be acquired at one or more specific timepoints or phases in the patient's breath cycle, and may result in capturing scans with a variety of TPP states. For instance, an assessment of the extent of emphysema may comprise instructing the patient to inhale to their maximum lung air capacity (herein referred to as "total lung capacity" or TLC) so that the scan can highlight areas where the parenchyma exhibits abnormally low density when subjected to low (e.g. negative) TPP. By contrast, an assessment of the extent of air-trapping in the lungs may comprise the patient to exhale to either a relaxed state (herein referred to as "functional residual capacity" or FRC) or a maximally compressed state (herein referred to as "residual volume" or RV). In this instance, the scan may highlight areas of abnormally low density after exhalation (e.g. expiration), corresponding to air that is unable to be expelled under relatively high (e.g. positive) TPPs.

For patients with ILD, the relevant quantifications may pertain to tissue that has abnormally high density. In some examples, such regions are analyzed via a TLC scan, since portions of tissue with an abnormally high density may stand out more clearly against healthy lung tissue having a lower density when the lungs are maximally filled with air. Since the air content varies widely between various phases (e.g. during a TLC scan and during an RV scan of the breath cycle), the density of both healthy and diseased parenchyma tissue may vary as well.

Density analysis applied to volumetric scans acquired, as described herein, may employ some notion of a normal or expected range for distinguishing healthy from diseased parenchymal tissue. For instance one way of measuring emphysematous lung tissue in a volumetric scan acquired at a TLC state involves aggregating the parenchymal regions whose density is lower than a predetermined threshold (e.g. −950 Hounsfield units (HU)). In other words, normal/healthy lung tissue may be expected to have a density higher than the predetermined threshold (e.g. −950 HU) even when subjected to the lowest (negative) achievable TPP (e.g. in a perfect TLC acquired scan). Similarly, air trapping in lung tissue may be assessed with a volumetric scan acquired at an RV state as well as using a different predetermined density threshold (e.g. −856 HU). Thus, at RV, normal lung tissue may be expected to have a density higher than the threshold (e.g. −856 HU) when subjected to the highest (e.g. positive) achievable TPP (e.g. in a perfect RV acquired scan).

At the other end of the spectrum, increased lung density may occur in patients with ILD. In some cases, this can be assessed by determining the lung tissue having densities between a lower density threshold (e.g., −600 HU) and an upper density threshold (e.g., −250 HU) on a volumetric scan obtained at TLC. As similarly discussed herein, it may be expected that healthy parenchymal tissue would have a density lower than the lower density threshold (e.g. −600 HU) at TLC. It should be noted that the threshold density values (HU) described above are exemplary in nature and in alternative examples other values may be used. For example, in some cases, an upper limit of approximately −250 HU can be used to exclude vascular structures from being considered in the analysis.

Figure 1B:
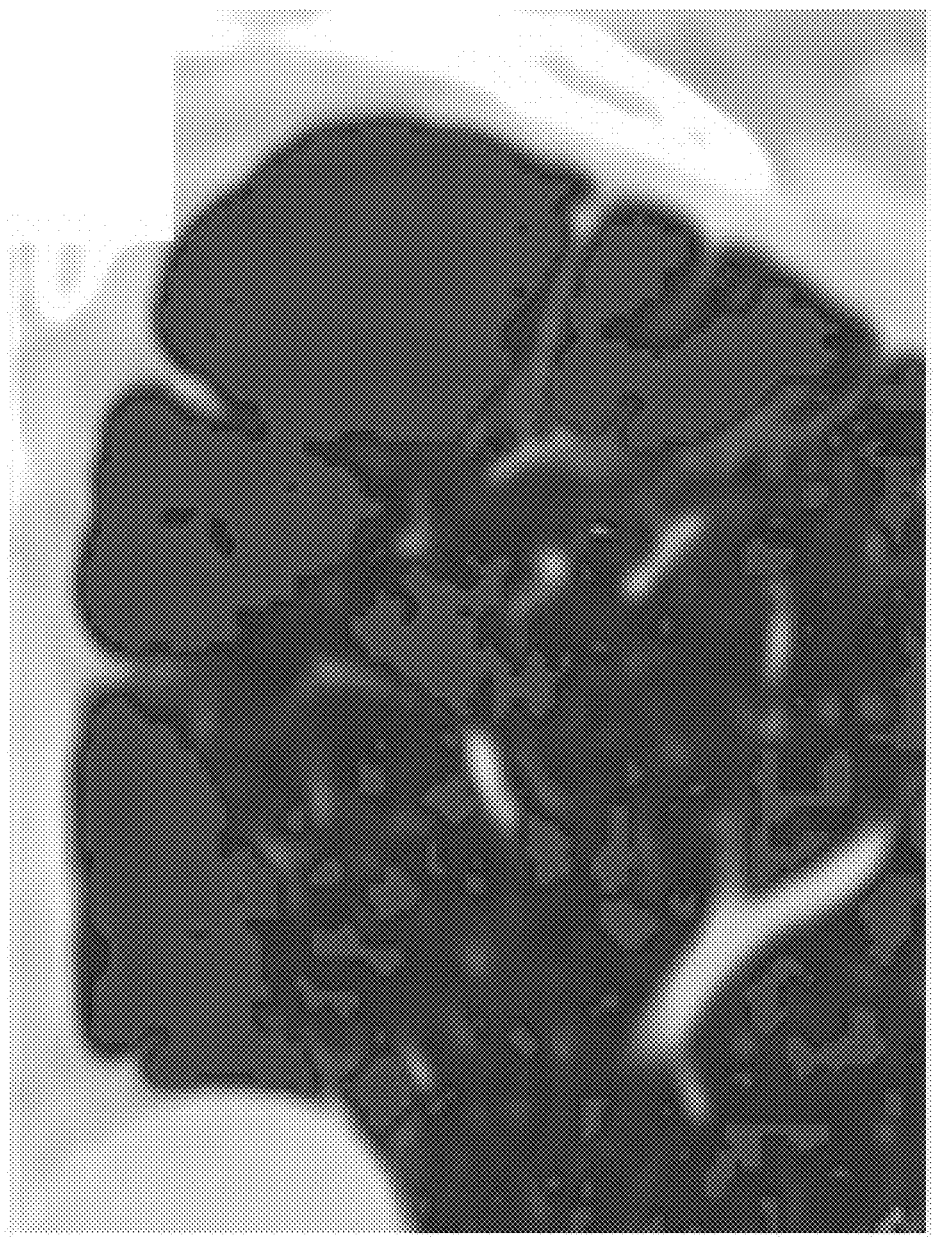
Figure 1C:
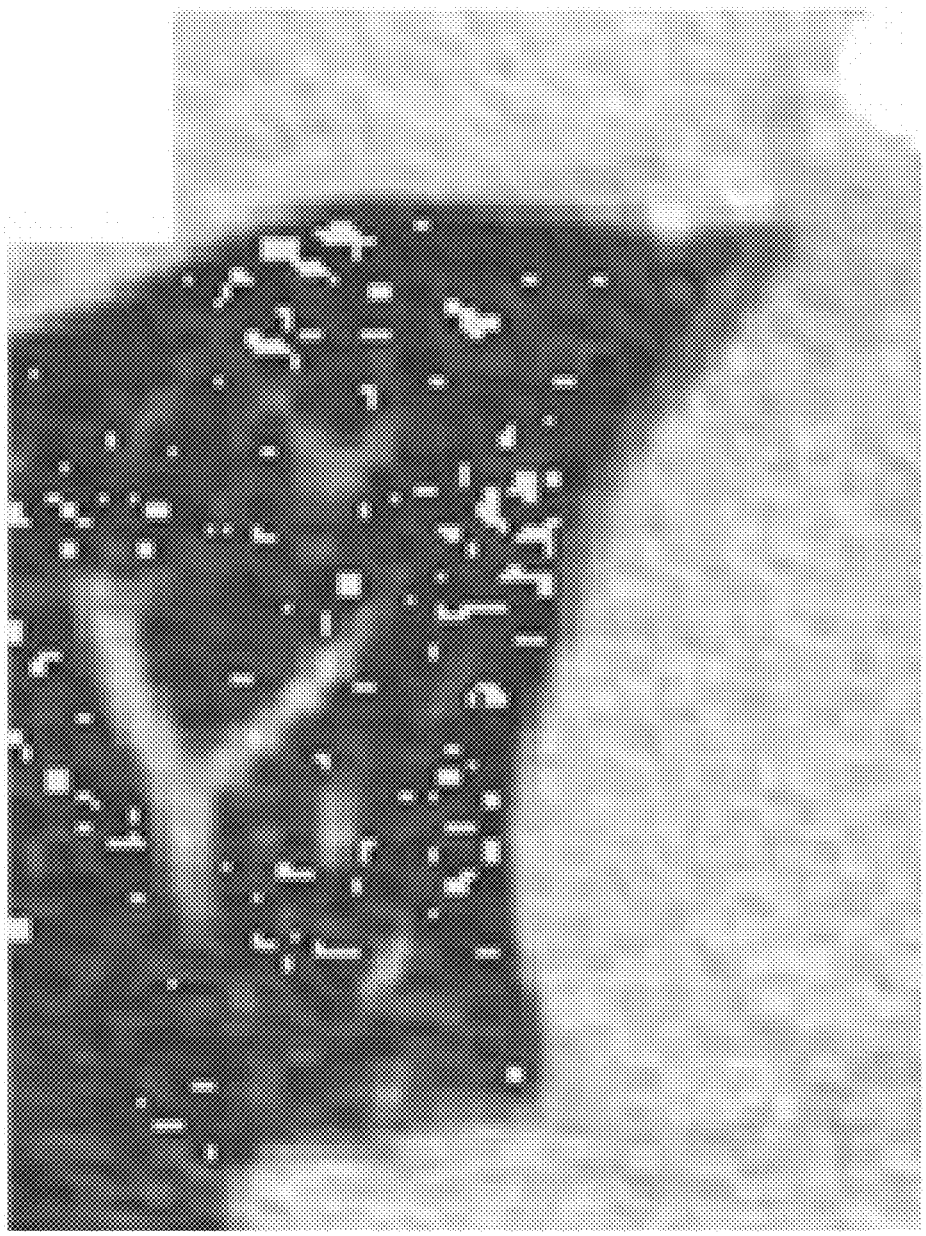

FIGS. 1A-C provide various examples of volumetric density threshold analyses for various disease characteristics as discussed herein. As shown, FIG. 1A illustrates a volumetric scan captured in a TLC phase wherein lung tissue comprising a lung density of higher than a threshold (e.g. −600 HU) may be emphasized (e.g. to a physician), for example, to illustrate locations representative of ILD. Similarly, FIG. 1B illustrates a volumetric scan captured in a TLC phase wherein lung tissue comprising a lung density of lower than a threshold (e.g., −950 HU) are emphasized (e.g. to a physician), for example, to illustrate locations representative of emphysema. Furthermore, FIG. 1C illustrates a volumetric scan captured in an RV phase wherein lung tissue comprising a lung density of lower than a threshold (e.g., −856 HU) are emphasized (e.g., to a physician), for example, to illustrate locations representative of air trapping in the lungs.

In various embodiments, various portions of the lungs may be emphasized if they meet a predetermined threshold, such as a predetermined density threshold associated with one or more conditions. In some embodiments, emphasizing the various portions of the lungs may comprise highlighting said portions (e.g. with a contrasting color compared to other portions of the displayed data), showing such portions with a different texture, outlining such portions, or the like.

Figure 2:
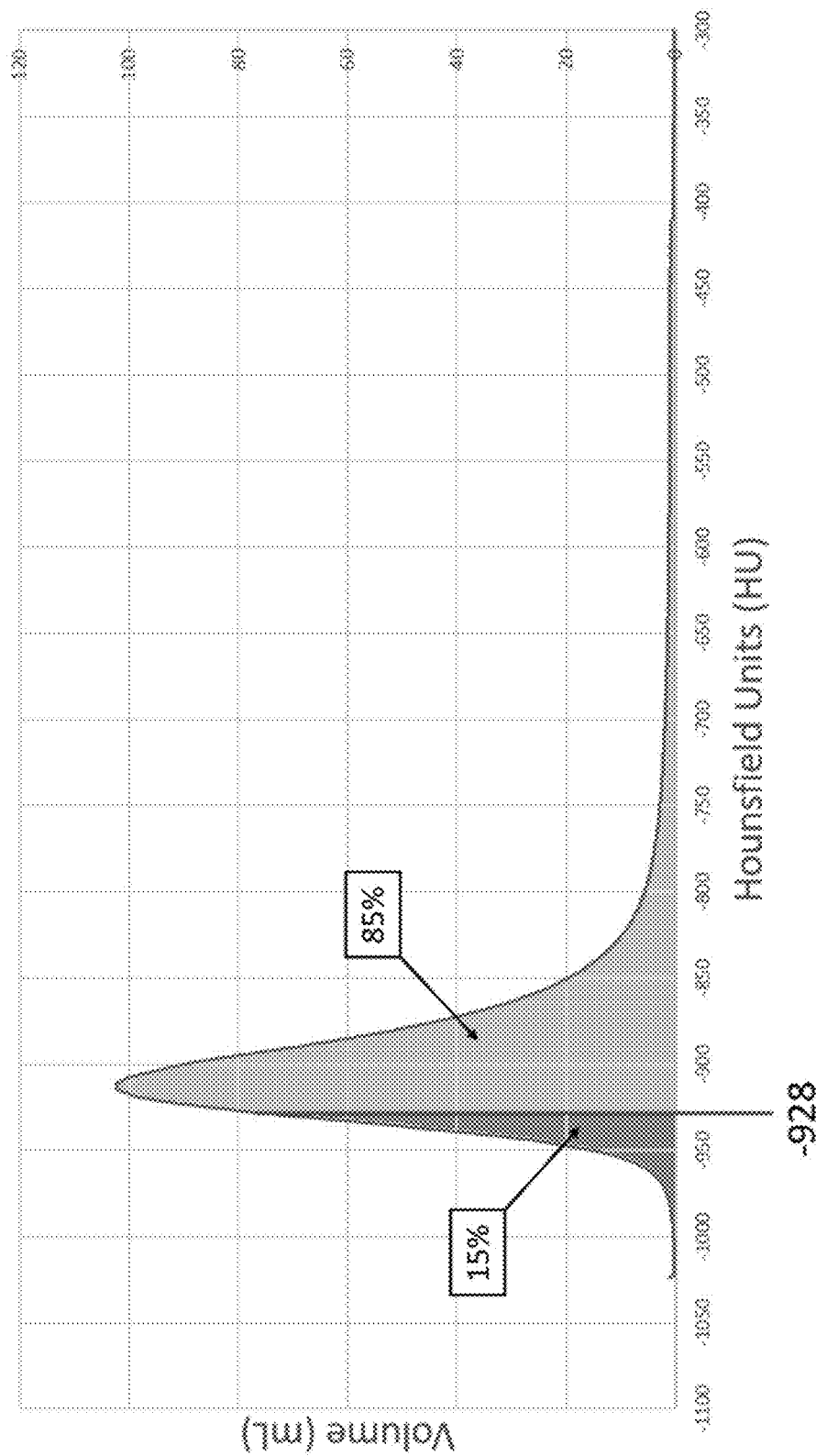
FIG. 2 illustrates a typical lung density histogram with the perc-15 HU value indicated.

Other methods of quantifying density for disease assessment can involve an analysis of the density histogram across the entire lung, both lungs, or a portion of the lungs. One example of such a quantification in a volumetric scan of the lungs comprises determining the threshold which splits the density histogram into 15% (below the threshold) and 85% (above the threshold). This type of quantification may be applied to a TLC phase volumetric scan and is herein referred to as perc-15. FIG. 2 illustrates a typical lung density histogram with a line representing perc-15 at −928 HU. Such an assessment may be used for a longitudinal assessment of disease (e.g. emphysema) across multiple scans of the same individual. If the measurement is observed to decrease in an individual over time, it can indicate the progression of emphysema.

Another common quantification of parenchyma lung disease can involve classifying tissue characteristics based on appearance within the volumetric scan images. Various degradations and disease effects can impact the lung tissue in a way that gives it a distinctive appearance (herein referred to as "texture") in volumetric scans of the lungs, such as grayscale lung CT images. The texture of the lung parenchyma may be altered by diseases that decrease lung density (e.g. centrilobular emphysema, paraseptal emphysema, panlobular emphysema, or the like) as well as diseases that increase lung density (e.g. interstitial lung disease, acute infectious pneumonia, or the like).

Figure 3A:
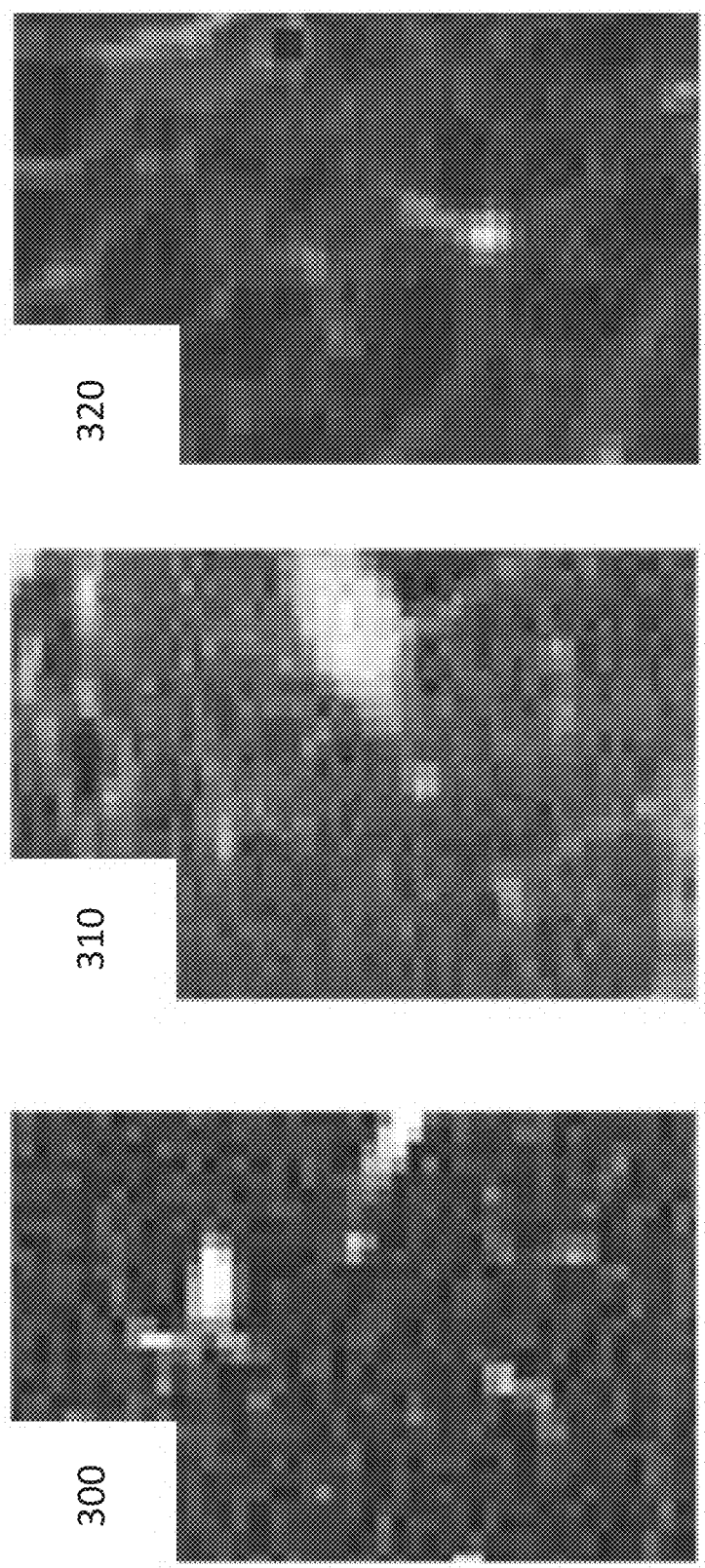
FIG. 3A illustrates some examples of the various disease-relevant texture types.
Figure 3B:
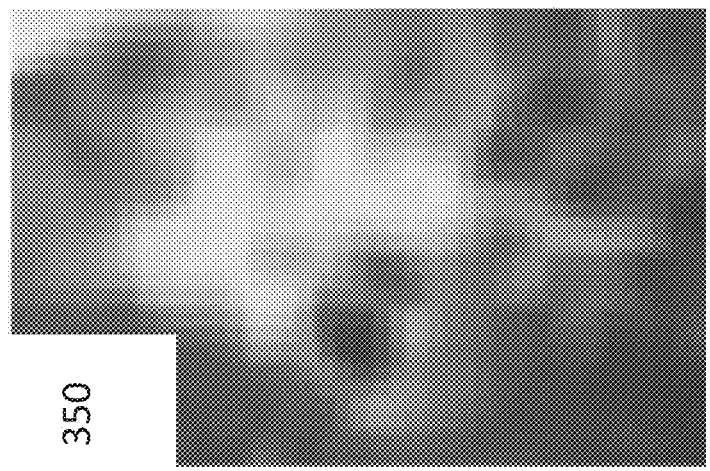
FIG. 3B illustrates other examples of the various disease-relevant texture types.
Figure 3B:
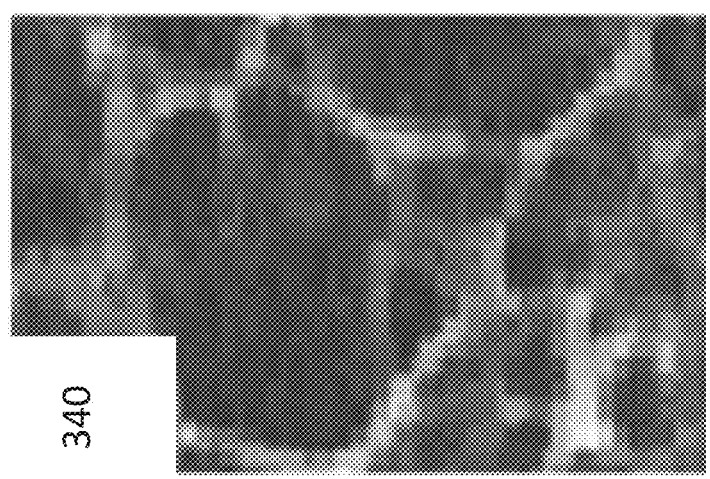
Figure 3B:
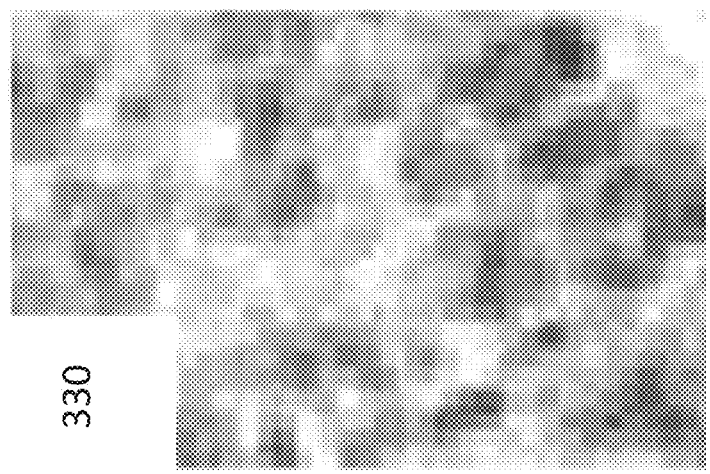

Interstitial lung disease may be characterized by tissue patterns known as ground glass opacities and lung fibrosis. For example, lung fibrosis on chest CT scans may produce the following abnormal texture patterns: reticulations, traction bronchiectasis and honeycombing. Acute infectious pneumonia may produce the following texture patterns: ground glass opacities and consolidative opacities. Some examples of the various disease-relevant texture types are shown in FIG. 3A and FIG. 3B. As shown, texture 300 may be representative of a normal lung parenchyma texture, texture 310 may be representative of a ground-glass texture, texture 320 may be representative of an emphysema texture, texture 330 may be representative of a reticulation texture, texture 340 may be representative of a honeycombing texture, and texture 350 may be representative of a consolidation texture.

Detecting and measuring the amount and distribution of various texture types, such as the texture types shown in FIG. 3A and FIG. 3B, throughout the lung can provide information for diagnosing, subtyping, and/or quantifying the progression of various pulmonary diseases. To provide an accurate recognition and assessment of such textures, it is sometimes assumed that the scan was acquired at full inspiration (e.g. TLC). Such a scan may be used because expiration can increase the density of healthy lung tissue and healthy lung tissue could be mistaken for a texture pattern that is associated with diseased lung tissue (e.g. ground glass opacities from acute pneumonia).

Another type of density-based analysis comprises comparing lung densities in an inspiratory scan with the densities in an expiratory scan of the same subject. Such comparative methods typically involve computing a point-to-point correspondence (e.g. registration) between the two scans so that the appearance of very specific tissue locations can be analyzed consistently. Some examples of inspiratory/expiratory comparison measures are parametric response mapping (PRM) and disease probability mapping (DPM).

The uses of density analysis such as those described herein to distinguish healthy from diseased lung tissue may rely on the compliance of the patient to exert the appropriate level of TPP and thus attain true lungs states of TLC, FRC, RV, or the like at the instant the scan is acquired. However, if a scan is captured while a patient is not at the prescribed status (e.g., TLC, FRC, RV), the tissue densities may be estimated incorrectly. For example, if a TLC scan is ordered but the patient fails to produce their maximum inspiratory effort (e.g. they do not achieve their lowest level of TPP or are not at their lowest level of TPP when the scan is captured), then the tissue densities may be overestimated. Similarly, if an expiratory RV scan is ordered but the patient fails to produce at their maximum expiratory effort (e.g., failing to achieve their highest level of TPP or are not at their highest level of TPP when the scan is captured), the tissue densities may be underestimated. Inaccuracies due to patient non-compliance can result in significant over-estimates and/or under-estimates of both tissue density and textural patterns that are associated with different lung diseases. For example, DPM type inspiratory/expiratory comparison methods sometimes assume that both the inspiratory and expiratory scans are acquired with appropriate TPPs. If one or the other (or both) scans are sub-optimal, then disease measurements may be less accurate. Accordingly, there is a need to address such problems by quantifying the TPP and account for it in subsequent analyses as described herein.

Another example that emphasizes the importance of TPP effects is in the assessment of lung nodules. In some examples, it can be important to quantify the size of lung nodules, especially when tracking their progression over time. In some examples, the soft and pliable characteristics of many lung nodules makes their size dependent upon the TPP state within the lungs. Under low (e.g. negative) TPP (e.g. during inspiration), some lung nodules can be significantly bigger than under high (e.g. positive) TPP (e.g. during expiration). When comparing lung nodule sizes across time, it may be useful to consider the effects of TPP to avoid over-estimating or under-estimating the nodule growth.

Accordingly, unexpected or non-optimal TPP values can lead to errors in assessing information, such as density values, nodule sizes, identified textures, or the like. As noted elsewhere herein, some embodiments of the present disclosure are related to quantifying aspects of one or more of the tissues and/or airspaces of interest based on the state of TPP during which those one or more scans were acquired. In some embodiments, TPP or a quantitative estimation thereof can be used to adjust for non-optimal TPP values when acquiring and analyzing, for example, volumetric scan data to account for the potential errors in such values in non-optimal scans.

As used herein, the term "effort metric" can be used to describe an estimate or measurement of the TPP. In some examples, an effort metric can include a quantitative value associated with the TPP, though need not represent the TPP itself, or be in the units of the TPP. In some embodiments, the effort metric can be the TPP itself, such as a pressure measured using a pressure sensor. In other examples, the effort metric can be a value or parameter associated with the TPP, such as a quantitative surrogate measure of the TPP.

In some embodiments the effort metric may be a raw score on some predetermined scale, such as a scale with maximal inspiration (minimal, negative TPP in a TLC state) at one end and maximal expiration (maximal, positive TPP in an RV state) at the other. Additionally or alternatively, the effort metric may be discretized into a smaller number of categorical designations. For instance, a five-category indication could be used with designations for: maximal expiration, moderate expiration, resting lung, moderate inspiration, and maximal inspiration; however, other categorical designations and/or designation labels have been contemplated.

In some examples, a quantitative estimation of TPP can be obtained by receiving volumetric scan data representative of a patient's pulmonary structure, such as from medical scan data, an external data source, a combination thereof, or the like. The estimation may further comprise processing the received volumetric pulmonary scan data to identify one or more anatomical structures within the volumetric pulmonary scan data; and analyzing the shape of the one or more identified anatomical structures. In some embodiments, TPP may be estimated by analyzing various shapes of one or more anatomical structures.

Figure 4B:
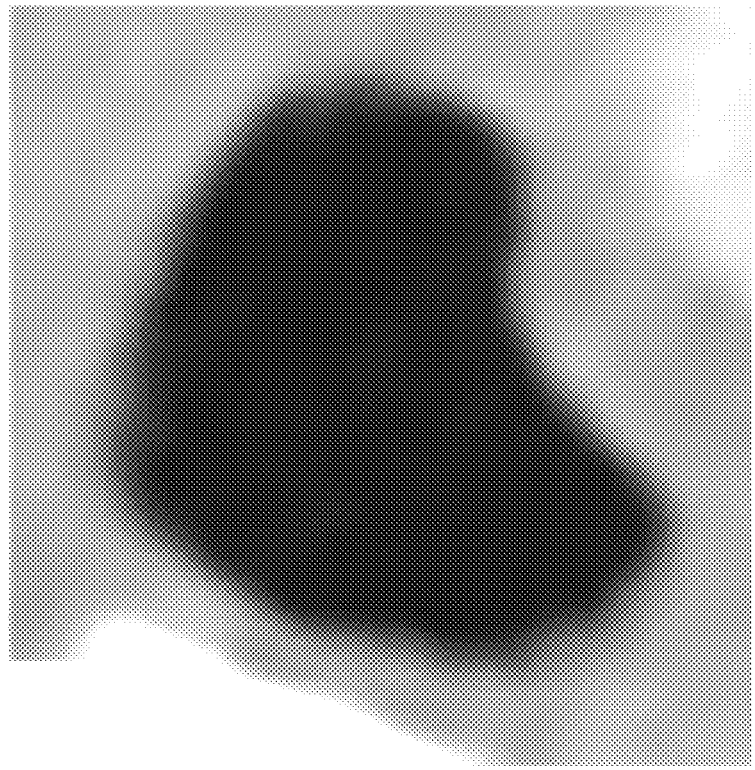
FIGS. 4A and 4B show an exemplary tracheal appearance for TLC and RV phases.
Figure 4A:
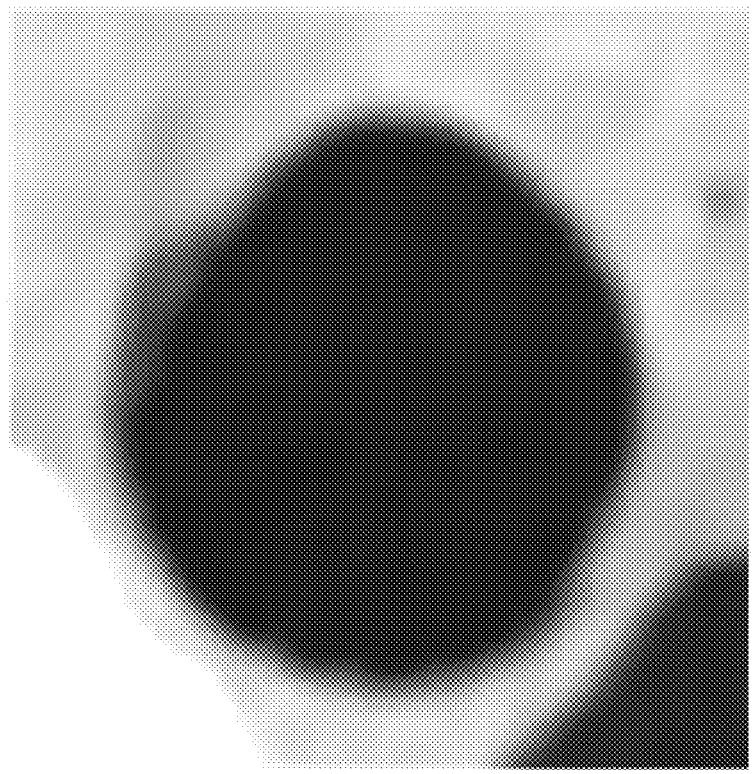

For example, FIGS. 4A and 4B provide an exemplary embodiment wherein TPP may be estimated by analyzing the cross-sectional shape of a patient's trachea. The physiological characteristics of the trachea may cause its posterior wall to deform and take on a distinct shape when a patient is inhaling versus exhaling due to the pressures (e.g. TPP) acting upon it, as shown in FIGS. 4A and 4B. Intrapleural pressure may impact the tracheal wall (or lumen) from outside, while atmospheric pressure is ambient from within. FIG. 4A illustrates an exemplary volumetric scan of a patient's trachea during a TLC phase. During inspiration or at an inhaled breath-hold (e.g. when TPP is negative) the intrapleural pressure external to the trachea can be lower than the ambient atmospheric pressure within the trachea, which may cause its flexible posterior wall to bow outward with a convex appearance as shown in FIG. 4A. Conversely, FIG. 4B illustrates an exemplary volumetric scan of a patient's trachea during a RV phase. During expiration or at an exhaled breath hold (e.g. when TPP is positive), the intrapleural pressure external to the trachea is higher than the ambient atmospheric pressure within the trachea, which may cause the posterior wall to collapse inward with a concave appearance as shown in FIG. 4B.

In an example embodiment, a relative measure of the amount of inward or outward bowing in the posterior trachea can be used as an effort metric associated with the TPP. In further embodiments, the effort metric could be determined using shape analysis, for instance, by delineating the posterior tracheal wall and measuring the curvature along it.

However, as described herein, various other methods, such as analysis of additional or alternative anatomical features may be used when determining an effort metric. For example, the diaphragm, lobar fissures (e.g. lobar fissures between the lobes of the lung), the lung, or the like may be used when determining a relative measure of TPP (e.g. the effort metric).

Figure 5A:
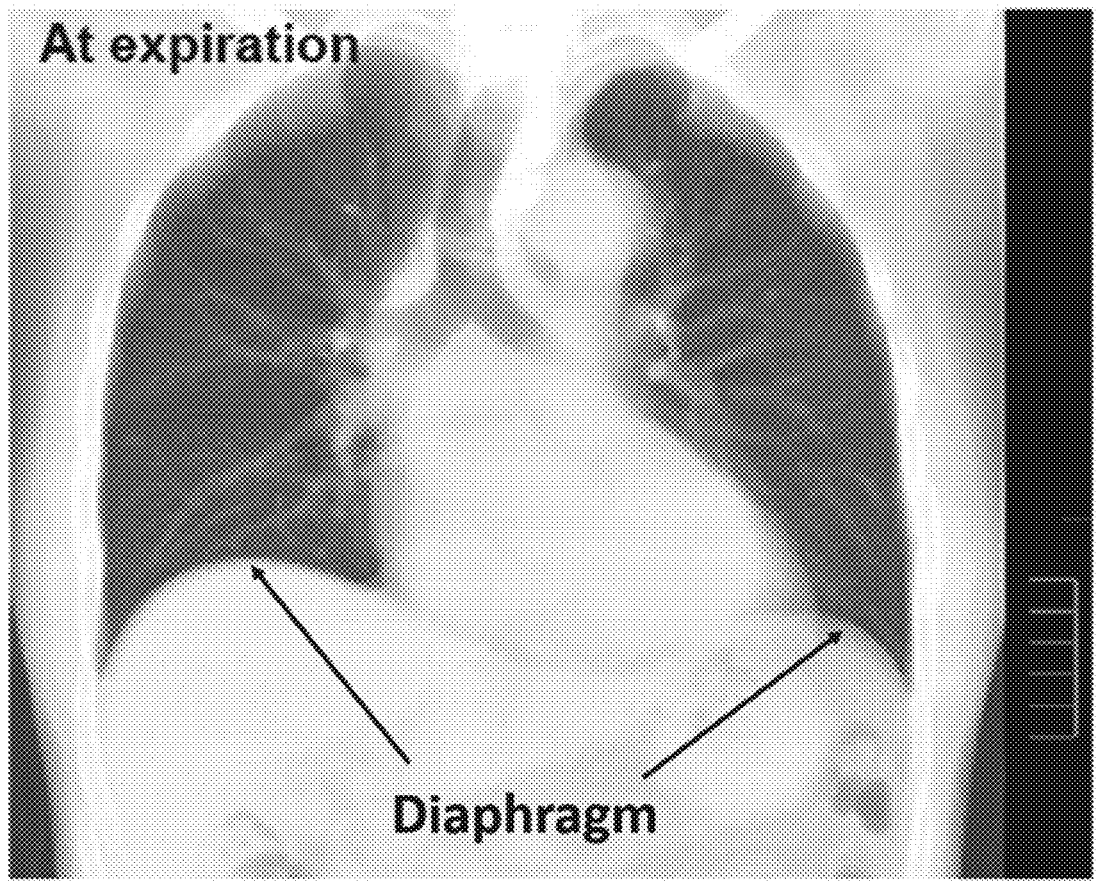
FIGS. 5A and 5B illustrate exemplary differences in diaphragm curvature between inspiratory and expiratory lung scans.
Figure 5B:
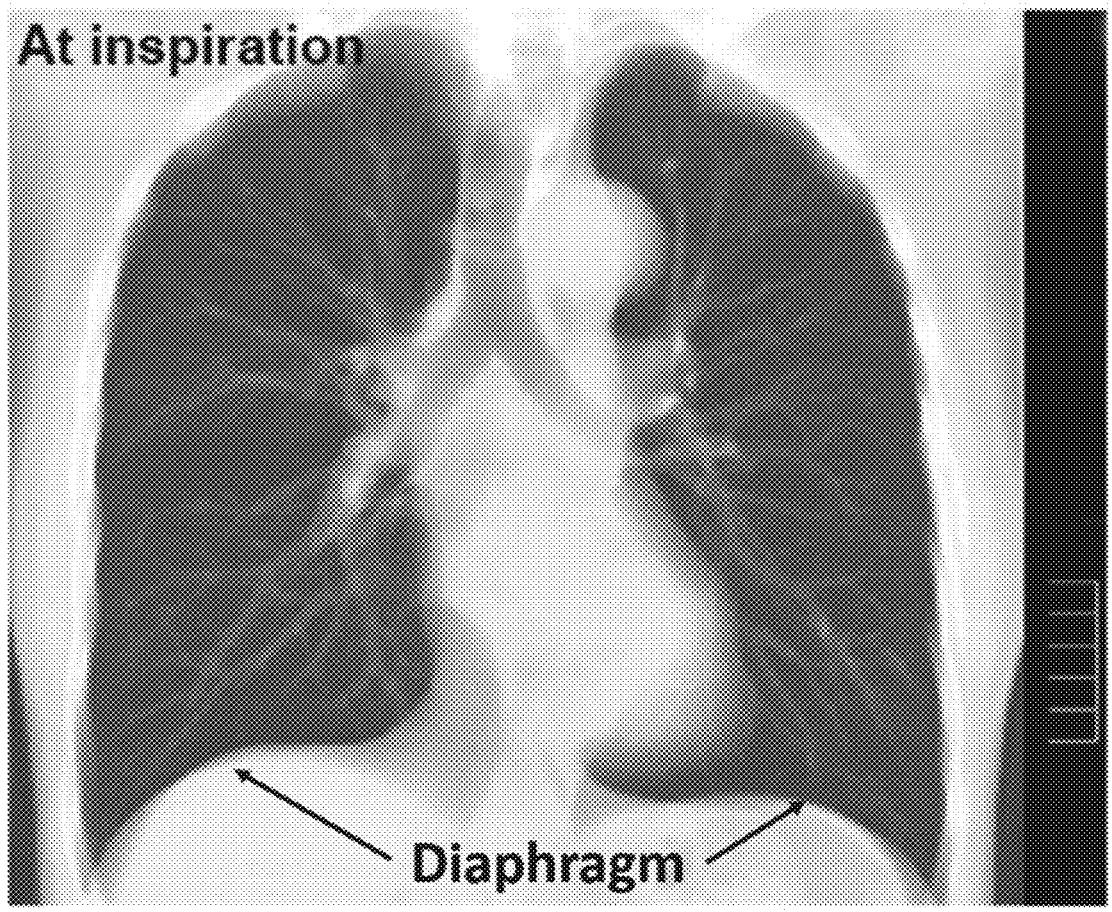

FIGS. 5A and 5B illustrate exemplary differences in diaphragm shape between inspiratory and expiratory lung scans. As shown in FIGS. 5A and 5B, the physiology of the diaphragm muscle may decrease in area and curvature on inspiration and increase in area and curvature on expiration. In various examples, one or more aspects of the diaphragm can be used to determine an effort metric, such as a size, shape, or the like.

In addition to the trachea and diaphragm, various features of the lungs can be used to determine an effort metric. For example, lobar fissures may undergo decreased curvature during an inspiration and increased curvature during expiration. The curvature can be used to determine an effort metric. Furthermore, intrinsic properties of the lung, such as the ratio of total lung volume to total lung surface area (or the ratio of the cubic root of total lung volume and the square root of the lung surface area) may be used to estimate TPP, and similarly can be used to determine an effort metric. In some examples, more than one anatomical structure may be analyzed when estimating TPP and/or determining an effort metric.

In some embodiments, determining the effort metric associated with a TPP value based on the shape of the one or more anatomical structures may comprise analyzing one or more quantitative aspects of the shape (e.g. curvature, volume or the like). In some embodiments, analyzing the shape may comprise comparing the shape of said one or more anatomical structures to known or predetermined shapes. Additionally or alternatively, analyzing the shape may comprise comparing the shape of said one or more anatomical structures to other shapes of said anatomical structures, such as from a database of one or more additional scans. In some embodiments, the scans may be of the same patient, however scans of other patients may also be used. In such embodiments, a machine learning algorithm or the like may be used to compare the volumetric scan to the database of additional scans.

Figure 6:
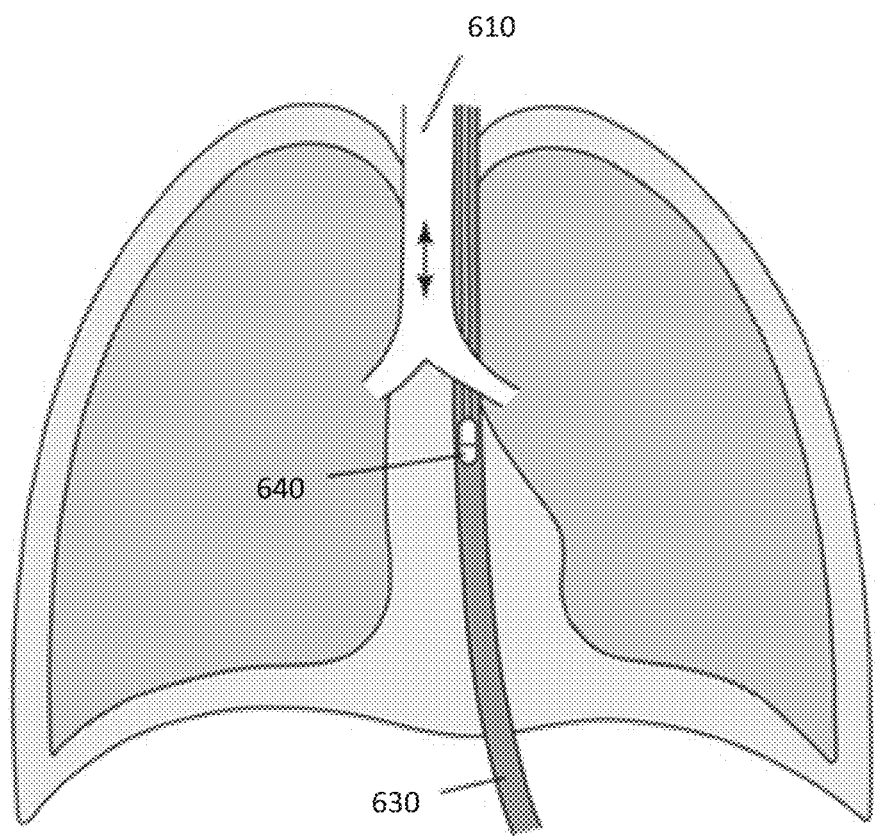
FIG. 6 provides an exemplary illustration of an esophageal balloon used to measure intrapleural pressure.

Additionally or alternatively to volumetric image data, in some examples, a sensor can be used to determine an effort metric associated with a particular scan. For instance, in some examples, an esophageal balloon may be used to directly measure intrapleural pressure, and the transpulmonary pressure gradient may be determined as the difference between the intrapleural pressure and the atmospheric pressure. FIG. 6 shows an example illustration of an esophageal balloon measuring an internal pressure. With respect to FIG. 6, the esophagus 630 is in close contact with the posterior aspect of the trachea 610 and also with the right parietal pleural. Intrapleural pressure can be transmitted through the parietal pleura, esophagus, and posterior membranous wall of the trachea 610. Thus, the intrapleural pressure recorded in the esophageal balloon 640 measures the intrapleural pressure and the external pressure acting on the wall of the flexible posterior membranous trachea. Output from the esophageal balloon 640 could be used either alone or in conjunction with other measures to produce an effort metric reflective of an overall TPP quantification score.

Once an effort metric is determined, for example, by assessing a shape of one or more anatomical structures (e.g., trachea, diaphragm, lung, etc.), such as from volumetric scan data, or based on a measurement, such as a pressure measurement as described with respect to FIG. 6, the determined effort metric can be used to determine one or more lung characteristics. For instance, in some embodiments, the one or more lung characteristics (e.g. lung density) may be determined based on the received volumetric scan, as discussed herein, as well as based on the determined effort metric and/or TPP value. In some embodiments, the effort metric can be used as an input into an automated analysis, such as a determination made via software or the like. Additionally or alternatively, the effort metric may be provided to a user/physician for consideration during a visual interpretation. In such embodiments, the effort metric may be provided via a user interface, a printed-out report, or the like. In general, incorporating the effort metric into an analysis can account for errors in analysis that may otherwise arise due to non-optimal effort (e.g., incomplete inspiration, etc.).

In such embodiments, an analysis of one or more lung characteristics may comprise adjusting one or more lung characteristics determined from the scan data based on the quantified degree of TPP (e.g. the effort metric). For instance, in some examples, one or more lung characteristics may be determined without considering the effort metric, and then may be revised using the effort metric.

The analysis adjustment may be done in a variety of ways. As an example, in the case of a CT scan analysis, the HU conventional thresholds that separate diseased from healthy tissue, as discussed herein, could be adjusted to account for the effort metric (e.g., the TPP when the data used for analysis was acquired). FIG. 7 provides various examples of how conventional thresholds may be adjusted to account for sub-optimal levels of TPP. As shown, when looking for emphysema or fibrosis, a sub-maximal inspiration may increase the density threshold from the conventional disease threshold of −950 HU and −600 HU, respectively. Furthermore, when looking for air trapping, a sub-maximal expiration may decrease the density threshold from the conventional disease threshold of −856 HU.

In some embodiments, the conventional CT threshold associated with a particular disease may be shifted by an absolute amount or by a percentage based on the determined effort metric. In other examples, the threshold may be shifted from the conventional threshold to a predetermined second threshold if the effort metric indicates sufficiently suboptimal TPP (e.g., the effort score is below a predetermined threshold). Additionally or alternatively, in some examples, in embodiments in which an effort metric is discretized into categorical designations, each designation can have an associated CT disease threshold associated therewith. For instance, a conventional threshold may be applied in cases designated as representing maximal inspiration, while a second threshold may be applied in cases designated as representing moderate inspiration.

Figure 8:
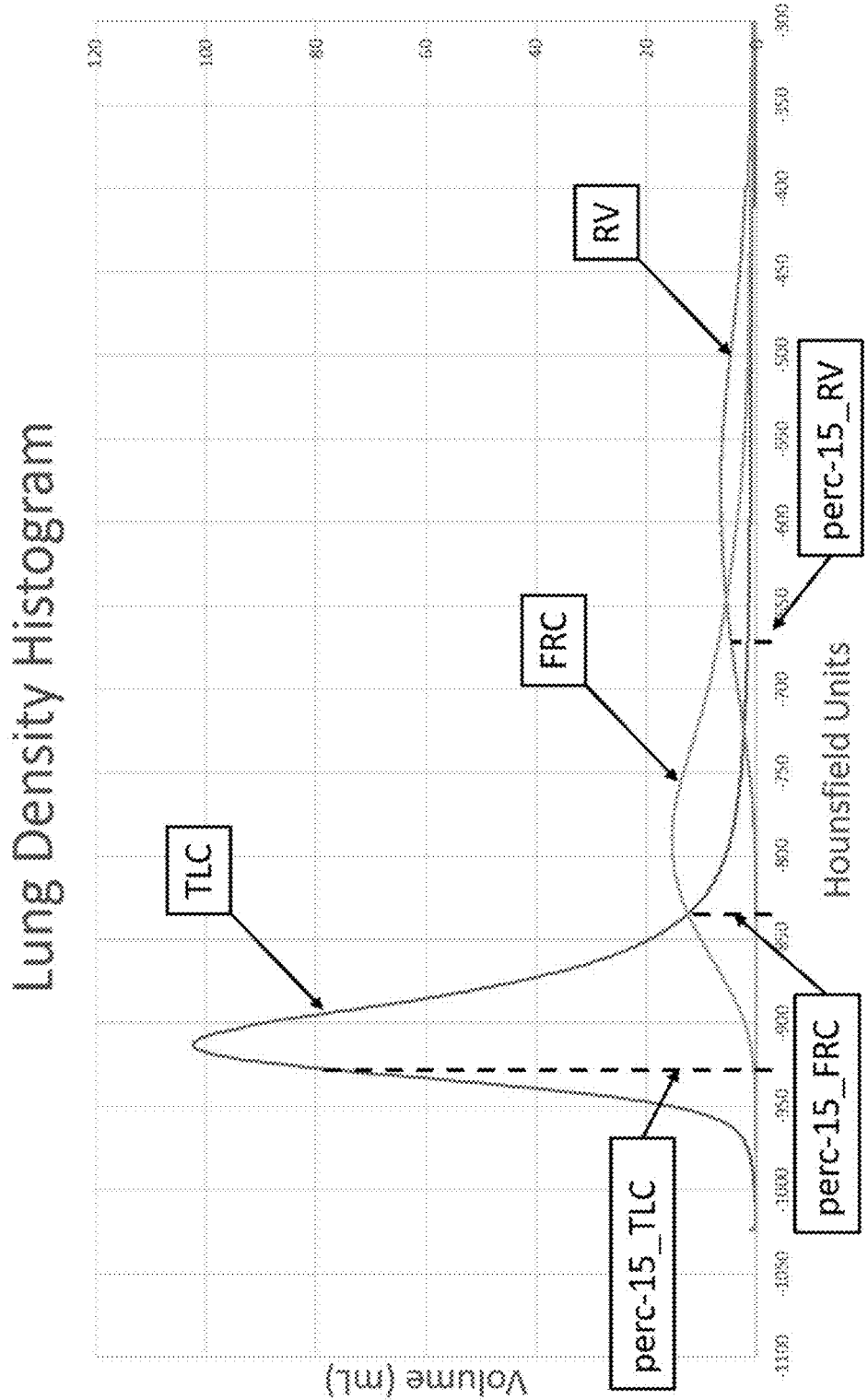
FIG. 8 provides exemplary lung density histograms for the TLC, FRC, and RV phases.

In the case of using the perc-15 measure, as shown in FIG. 2 and described herein, an adjustment for sub-optimal respiration may be made to the measurement itself. With respect to a density histogram, the density histogram across the whole lung or sub-region of the lung may shift from left (lower densities) to right (high densities) as the lung progresses from inspiration to expiration, as shown in FIG. 8. In some embodiments, density histograms may be gathered during full inspirations (e.g. TLC) or full expirations (RV). However, in situations wherein a full inspiration or full expiration is not reached, adjustments may be made to compensate for sub-maximal inspiration or expiration, for example, using a determined effort metric associated with the TPP. For example, for a volumetric scan which was supposed to be a TLC lung scan, an adjustment to the density histogram may involve shifting the determined perc-15 measurement to the left (e.g. decreasing it). Such an adjustment can account for the patient's sub-maximal inspiration, because the patient's maximal inspiration may have provided a perc-15 measurement which is further to the left (a lower density). Such adjustments may provide more accurate and meaningful results when analyzing perc-15 measurements over time when compared to situations not compensating for scans that may reflect non-maximal effort. This contrasts from techniques such as a sponge model technique, which uses populational statistics to estimate the expected lung volume. Furthermore, the sponge model technique assumes a normal/expected lung capacity and therefore does not account for the impact of disease on lung capacity. The effort metric/TPP approach, as described herein, advantageously allows for the adjustment of the scan-measured volume based on estimated effects of higher or lower transpulmonary pressure gradients. Thus, the effort metric/TPP approach may provide a more accurate representation of lung scan data, disease progression, or the like.

In some embodiments, adjustments to one or more anatomical features may comprise directly adjusting the image data (e.g. from a CT scan, or the like) in addition to or alternatively to adjusting various threshold or the like. Physiological models can be constructed to reflect the way in which lung tissue deforms and varies in density as TPP changes. For instance, data acquired from continuous scan acquisitions across one or more breath cycles (e.g. via four-dimensional computed tomography, or 4DCT) could be used to fit a model for tissue volume and density against TPP. By applying such a model, for instance, a longitudinal series of scans acquired at two or more time points across a disease or treatment cycle could be normalized according to TPP. Normalizing the scans in this way may enable direct comparison across the adjusted images (or other derived biomarkers) to provide a more fair and accurate analysis of disease progression.

Additionally or alternatively, TPP estimates (e.g. the effort metric) may be used when determining lung texture. Some lung textures, such as ground glass, can look different between a TLC scan, an RV scan, as well as scans in intermediate states therebetween. Accordingly, sub-optimal scans (e.g. scans of sub-optimal expiration, sub-optimal inspiration, or the like) may result in various lung textures appearing different on volumetric scans compared to optimal scans. In some instances, such differences may result in mischaracterization of lung textures, mischaracterization of lung diseases, or the like.

In some embodiments, lung classification via texture analysis may comprise comparing received scan data of a patient having a particular effort metric to other volumetric scan data, for example, reflecting scans captured having a similar effort metric. In some embodiments, the scans may be of the same patient, however scans of other patients may also be used. In some embodiments, scans can be compared to a database of scan information including effort metric information. For example, in some embodiments, a machine learning algorithm or the like may be used to compare volumetric scan data and an associated effort metric to a database of additional scan data having associated effort metric information. Such a machine learning algorithm can be used to classify the texture of the volumetric scan data based on the data and the associated effort metric.

In some embodiments, the volumetric scans in the database may comprise an associated TPP value (e.g. effort metric) as well as a known texture classification. Thus, when comparing a received volumetric scan to the database, the TPP value and/or effort metric may be used to provide more accurate results. For example, volumetric scan data of a patient may be received, an effort metric may be determined for when the volumetric scan data was acquired, and the volumetric scan data may be compared against a database of volumetric scans based on image data as well as the effort metric to determine textures within the received volumetric scan data.

Figure 9:
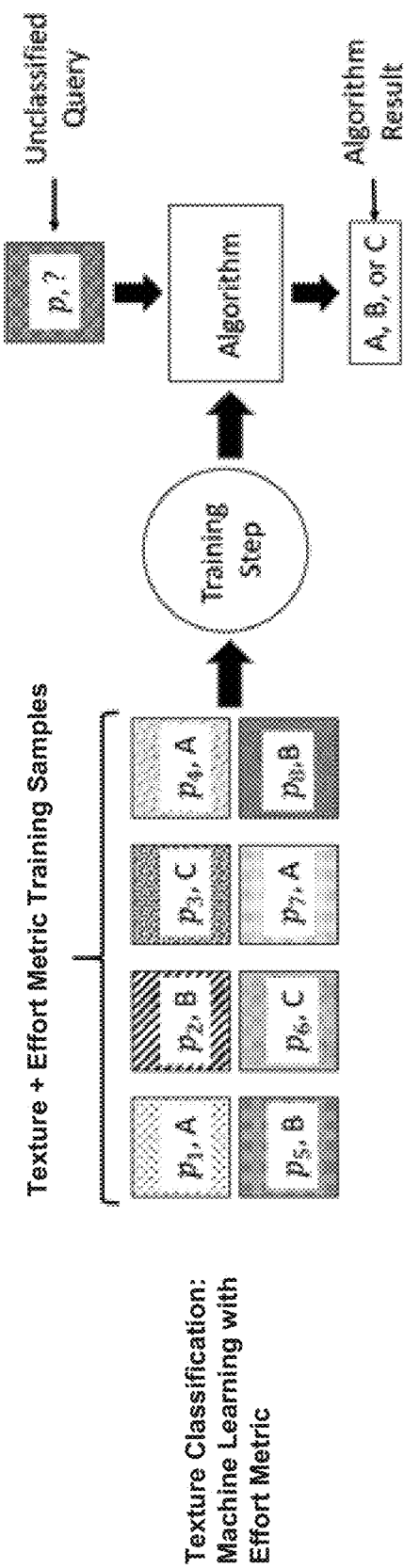
FIG. 9 provides an exemplary flow chart on how a database comprising texture and TPP training samples may be used to classify the textures in a received volumetric scan.

FIG. 9 shows an example schematic diagram showing how a database comprising texture and effort metric training samples may be used to classify the textures in a received volumetric scan. As shown, a plurality of data sets including texture information and effort metric information can be analyzed via a training step. An unclassified data set, including, for example, a received volumetric scan as well as a determined effort metric information for said volumetric scan may be analyzed using an algorithm (e.g., a machine learning algorithm) trained on the database of volumetric scans to determine the textures within the received volumetric scan data corrected for the associated effort metric as appropriate.

Furthermore, various other lung characteristics may be corrected or adjusted based on a determined effort metric associated with a TPP. For instance, lung nodule assessments may be adjusted based on a determined effort metric. As discussed above, lung nodule size can change based on the TPP value. In other words, at various TPP values, the same lung nodule of a patient may vary in size. In some embodiments, lung nodule size can be normalized based on an effort metric at the time volumetric scan data is captured to compensate for the changes in nodule size due to different TPP levels. In some examples, processes involve determining an amount of nodule size change that is attributable to differences in TPP across different volumetric scan acquisitions. Accordingly, monitoring a patient's lung nodule size over time will be unaffected by changes due merely to differences in TPP when volumetric scan data is captured. This can help reduce both false positives and false negatives with respect to detecting actual changes in nodule size over time.

In some examples, density data (e.g., from a volumetric scan) can be included in an analysis of how nodule size varies with TPP. For instance, in some embodiments, a model of how size varies with density can be built from a large set of examples, wherein each example comprises scans acquired at two or more TPP states (e.g. TLC and RV) and a correspondence of the one or more nodules across the various scans (e.g., concurrent scans or scans captured within a short time of one another). In some such examples, every set (e.g., pair) of concurrent scans of the same nodule constitutes a single data point for defining a model, wherein such data points include difference values or "deltas" of nodule size and TPP, as well as mean nodule density. A plurality of training examples (e.g., sets of such scan data) can be used to generate a model that can estimate the degree of size and/or density change attributable to differences in TPP across two different scan acquisitions. This effect could be directly applied to the observed size and/or density change in order to estimate the net size change due to actual growth or shrinkage of lung nodules and/or density changes in the lung nodules.

Figure 10:
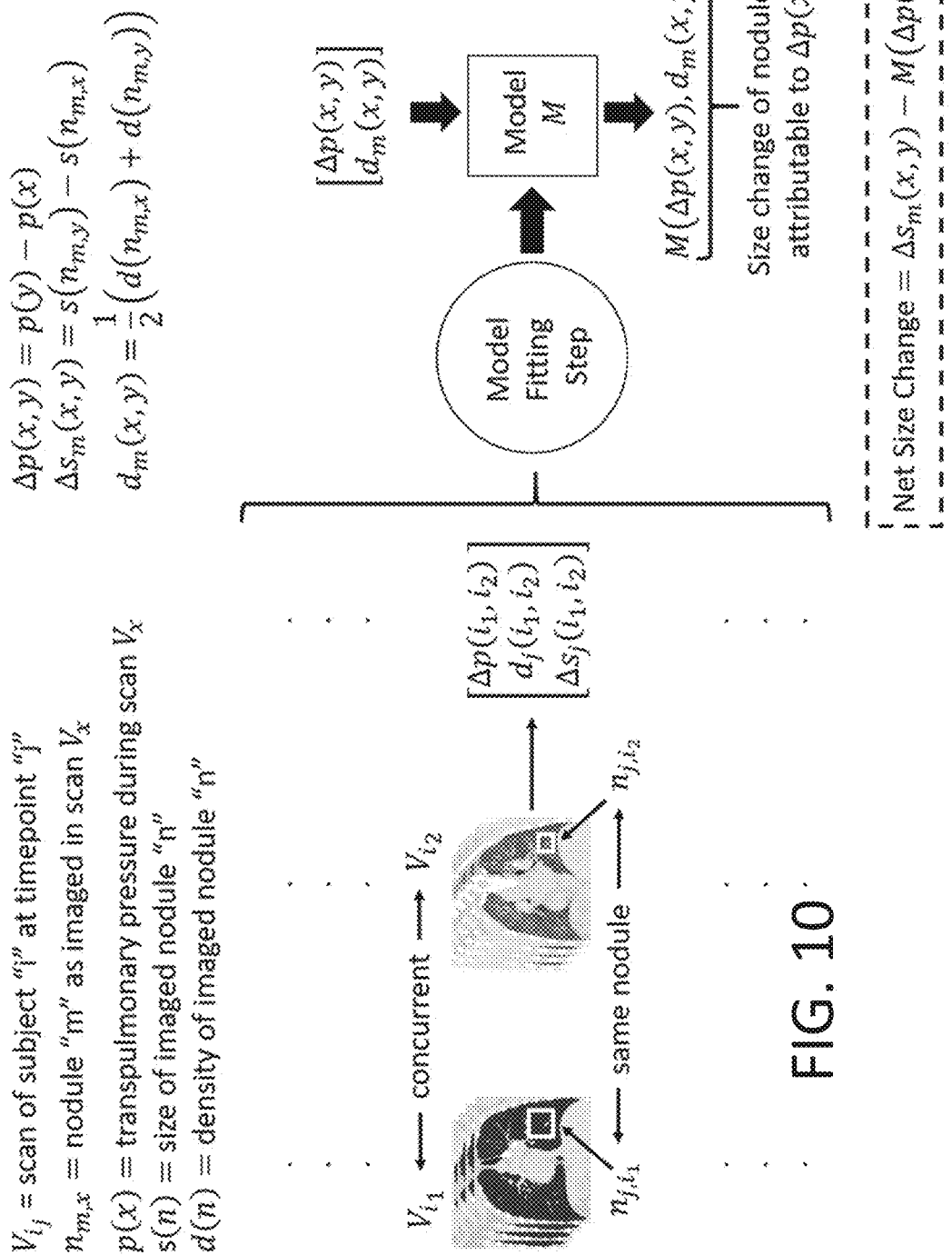
FIG. 10 provides an exemplary embodiment wherein volumetric scan data comprising lung nodules may be compared to a database of additional volumetric scans.

FIG. 10 shows an example diagram illustrating a process for generating and using a model for assessing nodule size and density in view of TPP data. As shown, concurrent volumetric scans $Vi_1$ and $V_{i2}$ having a common nodule n. While shown as using concurrent scans, in some embodiments, scans may be acquired within a short enough time frame of one another so that nodule size change and/or nodule density changes is attributable to TPP changes and not other physiological phenomena. Changes in the pressure (p(x)), nodule size (s(n)), and nodule density (d(n)) between the scans can be recorded. The pressure (p(x)) can include a measured TPP or can use another effort metric associated with the TPP, such as those described herein.

Similar data can be acquired for a plurality of sets of scans, and a model can be generated for relating changes in nodule size, nodule density, and TPP. Such a model can be used when analyzing future scans. For example, a pair of scans showing a nodule changing in size and/or density can be assessed using the model in order to determine how much of the size change and/or density change is attributable to pressure changes. In some such examples, a machine learning algorithm can be used to generate such a model and/or apply such a model to a subsequently captured set of scans.

In some cases, a patient may receive periodic volumetric scans to track the progression of one or more lung nodules. However, when acquiring the volumetric images, the patient may not exert the same amount of inspiration/expiration every time a volumetric image is acquired. Thus, correcting for the TPP value and/or effort metric such as via the model illustrated in FIG. 10 may allow for a more accurate assessment of nodule size and/or lung nodule density over time.

Figure 11:
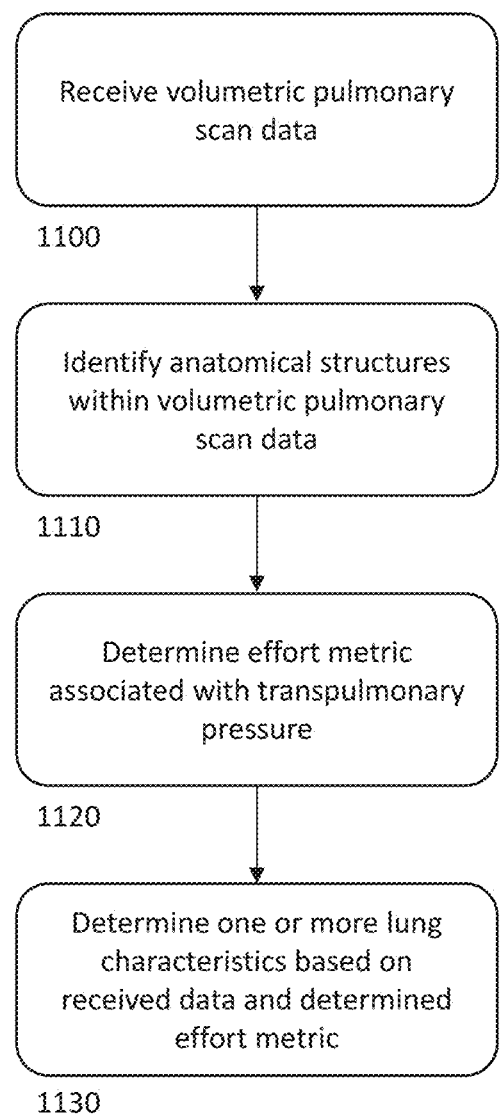
FIG. 11 is an example process-flow diagram illustrating a method for using an effort metric in various analyses.

As described herein determining and utilizing an effort metric while performing various measurements and/or analyses can improve accuracy of disease diagnoses and assessment of various anatomical features (e.g., nodule size, nodule density) over time. FIG. 11 is an example process-flow diagram illustrating a method for using an effort metric in various analyses.

The process of FIG. 11 includes receiving volumetric pulmonary scan data (1100), for example, CT scan data of the lungs and surrounding anatomy. The process further includes identifying anatomical structures within the volumetric pulmonary scan data (1110) and determining an effort metric associated with transpulmonary pressure (1120). In some examples, identifying anatomical structures within the volumetric pulmonary scan data (1100) includes identifying one or more anatomical structures that can be used to determine the effort metric (1120). For example, as described herein, the process can include identifying a trachea or diaphragm within the volumetric pulmonary scan data and using such anatomy to determine an effort metric (e.g., based on a recognized shape within the data and/or a measured parameter, such as a curvature or distance). Additionally or alternatively, in some embodiments, an effort metric can be determined using a measurement, such as a pressure measurement (e.g., via an esophageal balloon). As described herein, the effort metric can be associated with the TPP present at the time the volumetric pulmonary scan data was captured and can provide information representing the state of the pulmonary system at the time (e.g., TLC, RV, or an intermediate state therebetween).

The process includes determining one or more lung characteristics based on the received volumetric pulmonary scan data and the determined effort metric (1130). Determining one or more lung characteristics can include determining a density value associated with various voxels within the volumetric pulmonary scan data, wherein the density value could be adjusted based on the determined effort metric. Additionally or alternatively, determining one or more lung characteristics can include comparing determined density values (raw or adjusted via the effort metric) to one or more thresholds for diagnosing one or more pulmonary conditions. As described herein, the density values and/or the threshold values can be adjusted from a baseline value based on the determined effort metric. Additionally or alternatively, such one or more lung characteristics can include nodule size (e.g., a current nodule size and/or changes in a nodule size over time) and/or a texture classification of the volumetric pulmonary scan data.

In some embodiments, the adjustments based on the determined effort metric, such as those described herein, may be different depending on the analysis being performed and/or the anatomical location. For instance, the fractional volume of air that is displaced while breathing can be different among the lobes of the lung due to their size, the location with respect to other anatomy (e.g. the diaphragm), and/or the patient's position when the data is collected (e.g. being in an upright position, lying down, etc.). Additionally or alternatively, different regions of the lung (e.g. different lobes or sub-lobes within the lung) may respond differently to modulations in TPP. For example, the lower lobes may have greater ventilation than the upper lobes, which can result in greater changes in size and/or density during the breath cycle when compared to the upper lobes. Because of this, an adjustment for parenchyma density or the like could be implemented in a way that factors in the specific location/region of the lung. For example, an adjustment model for parenchyma density or the like could comprise a lobe-dependent or region-dependent correction based on the globally measured effort metric.

Methods such as those described herein (e.g., with respect to FIG. 11) can be performed, for example, via one or more processors. In some examples, methods can be included in non-transitory computer readable medium configured to, when executed, cause such one or more processors to perform such methods.

In some cases, such processes can be performed in conjunction with performing one or more scans to acquire volumetric pulmonary scan data, such as on-site in a medical facility. Additionally or alternatively, in some cases, volumetric pulmonary scan data generated at a medical facility can be sent to a separate location for such processing.

Various non-limiting embodiments have been described. These and others are within the scope of the following enumerated embodiments.

The invention claimed is:

1. A method for analyzing a patient based on a volumetric pulmonary scan comprising:
   receiving volumetric pulmonary scan data representative of a patient's pulmonary structure;
   processing the received volumetric pulmonary scan data to identify one or more anatomical structures within the volumetric pulmonary scan data;
   analyzing a shape of the one or more identified anatomical structures;
   determining a level of transpulmonary pressure defining an effort metric based on the shape of the one or more identified anatomical structures such that the effort metric is based on the shape of the one or more identified anatomical structures; and
   determining one or more physiological or anatomical parameters of the patient based on the received volumetric pulmonary scan data and the effort metric.

2. The method of claim 1, wherein the one or more identified anatomical structures comprises a trachea, and wherein the determining the level of transpulmonary pressure defining the effort metric comprises analyzing the shape of the trachea in the volumetric pulmonary scan data.

3. The method of claim 2, wherein
   determining one or more physiological or anatomical parameters based on the received volumetric pulmonary scan data and the effort metric comprises comparing the received volumetric pulmonary scan data and the effort metric to a database; and
   the one or more physiological or anatomical parameters comprises lung texture and the database comprises a texture database.

4. The method of claim 2, wherein the determining the level of transpulmonary pressure defining the effort metric comprises categorizing the volumetric pulmonary scan into one of a plurality of effort categories.

5. The method of claim 1, further comprising determining a transpulmonary pressure value associated with the received volumetric pulmonary scan data; and wherein
   determining the level of transpulmonary pressure defining the effort metric comprises receiving a pressure measurement representative of an intrapleural pressure corresponding to the received volumetric pulmonary scan data; and
   the determining the transpulmonary pressure value is based on the received pressure measurement.

6. A non-transitory computer readable medium programmed with instructions for causing one or more processors to perform a method for analyzing a patient based on a volumetric pulmonary scan comprising:
   receiving volumetric pulmonary scan data representative of a patient's pulmonary structure;
   processing the received volumetric pulmonary scan data to identify one or more anatomical structures within the volumetric pulmonary scan data;
   analyzing a shape of the one or more identified anatomical structures;
   determining a level of transpulmonary pressure defining an effort metric based on the shape of the one or more identified anatomical structures such that the effort metric is based on the shape of the one or more identified anatomical structures; and
   determining one or more physiological or anatomical parameters associated with the patient based on the received volumetric pulmonary scan data and the effort metric.

7. The non-transitory computer readable medium of claim 6, wherein the one or more identified anatomical structures comprises a trachea, and wherein determining the level of transpulmonary pressure defining the effort metric comprises analyzing the shape of the trachea in the volumetric pulmonary scan data.

8. The non-transitory computer readable medium of claim 6, wherein the one or more anatomical structures comprises a diaphragm.

9. The non-transitory computer readable medium of claim 6, wherein determining one or more physiological or anatomical parameters based on the received volumetric pulmonary scan data and the effort metric comprises determining one or more physiological or anatomical parameters based on the received volumetric pulmonary scan data and adjusting the one or more physiological or anatomical parameters based on the effort metric.

10. The non-transitory computer readable medium of claim 9, wherein the one or more physiological or anatomical parameters comprises lung density.

11. The non-transitory computer readable medium of claim 9, wherein the adjusting the one or more physiological or anatomical parameters is additionally based on the anatomical location of the one or more physiological or anatomical parameters; and wherein the anatomical location comprises a first lobe of a lung and adjusting the one or more physiological or anatomical parameters is based on whether the first lobe is an upper lobe, a middle lobe, or a lower lobe.

12. The non-transitory computer readable medium of claim 9, wherein adjusting the one or more physiological or anatomical parameters based on the effort metric comprises shifting a density value at each of a plurality of voxels according to the effort metric.

13. The non-transitory computer readable medium of claim 9, wherein adjusting the one or more physiological or anatomical parameters based on the effort metric comprises determining a density histogram based on the volumetric pulmonary scan data and shifting the density histogram to map density values based on the effort metric.

14. The non-transitory computer readable medium of claim 13, wherein:

the adjusting the one or more physiological or anatomical parameters based on the effort metric further comprises determining a density histogram characteristic based on the volumetric pulmonary scan data; and the shifting the density histogram characteristic to map density values based on the effort metric further comprises shifting the density histogram characteristic.

15. The non-transitory computer readable medium of claim 14, wherein:

determining the density histogram characteristic comprises determining a perc-15 measurement; and shifting the density histogram comprises adjusting the perc-15 measurement based on the effort metric.

16. The non-transitory computer readable medium of claim 6, wherein determining one or more physiological or anatomical parameters based on the received volumetric pulmonary scan data and the effort metric comprises comparing the received volumetric pulmonary scan data and the effort metric to a database.

17. The non-transitory computer readable medium of claim 16, wherein the one or more physiological or anatomical parameters comprises lung texture and the database comprises a texture database.

18. The non-transitory computer readable medium of claim 16, wherein:

the database comprises at least one model of volumetric pulmonary scan data;

the volumetric pulmonary scan data comprises volumetric pulmonary scan data of the patient during inspiration;

the at least one model comprises baseline values associated with a full inspiration; and comparing the received volumetric pulmonary scan data and the effort metric to the at least one model comprises:

shifting the baseline values of the at least one model based on the effort metric; and comparing the received volumetric pulmonary scan data to the shifted baseline values.

19. The non-transitory computer readable medium of claim 16, wherein:

the database comprises at least one model of volumetric pulmonary scan data;

the volumetric pulmonary scan data comprises volumetric pulmonary scan data of the patient during expiration;

the at least one model comprises baseline values associated with a full expiration; and comparing the received volumetric pulmonary scan data and the effort metric to the at least one model comprises:

shifting the baseline values of the at least one model based on the effort metric; and comparing the received volumetric pulmonary scan data to the shifted baseline values.

20. The non-transitory computer readable medium of claim 16, wherein the database comprises at least one threshold value, and wherein determining one or more physiological or anatomical parameters based on the received volumetric pulmonary scan data and the effort metric comprises comparing volumetric pulmonary scan data to the at least one threshold value.

21. The non-transitory computer readable medium of claim 20, wherein the at least one threshold value is based on the effort metric.

22. The non-transitory computer readable medium of claim 6, wherein determining one or more physiological or anatomical parameters based on the received volumetric pulmonary scan data and the effort metric comprises, for each of one or more locations within the volumetric pulmonary scan data, comparing volumetric pulmonary scan data to a threshold value to determine whether a condition is present at such location.

23. The non-transitory computer readable medium of claim 22, wherein the threshold value is adjusted from a baseline threshold value based on the effort metric.

24. The non-transitory computer readable medium of claim 6, wherein the one or more physiological or anatomical parameters comprises:

blood flow, artery size, vein size, heart size, lung nodule size, or muscle mass.

25. The non-transitory computer readable medium of claim 6, wherein determining the level of transpulmonary pressure defining the effort metric comprises categorizing the volumetric pulmonary scan into one of a plurality of effort categories.

26. The non-transitory computer readable medium of claim 25, wherein the plurality of effort categories comprises at least five effort categories.

27. The non-transitory computer readable medium of claim 6, wherein the volumetric pulmonary scan data comprises CT scan data.

28. The non-transitory computer readable medium of claim 6, wherein:

the receiving the volumetric pulmonary scan data representative of the patient's pulmonary structure comprises receiving a first set of volumetric pulmonary scan data and a second set of volumetric pulmonary scan data, each set containing volumetric scan data representing a pulmonary nodule;

determining the level of transpulmonary pressure defining the effort metric comprises determining a first level of transpulmonary pressure defining a first effort metric associated with the first set of volumetric pulmonary scan data and a second level of transpulmonary pressure defining a second effort metric associated with the second set of volumetric pulmonary scan data; and the determining the one or more physiological or anatomical parameters comprises:

determining a first size of the pulmonary nodule in the first set of volumetric pulmonary scan data;

determining a second size of the pulmonary nodule in the second set of volumetric pulmonary scan data;

determining a size difference of the pulmonary nodule based on the determined first size and the determined second size; and characterizing the size difference of the pulmonary nodule based on the determined size difference, the first effort metric, and the second effort metric.

29. The non-transitory computer readable medium of claim 6, wherein the method further comprises determining a transpulmonary pressure value associated with the received volumetric pulmonary scan data.

30. The non-transitory computer readable medium of claim 29, wherein determining the level of transpulmonary pressure defining the effort metric comprises receiving a pressure measurement representative of an intrapleural pressure corresponding to the received volumetric pulmonary scan data, and wherein the determining the transpulmonary pressure value is based on the received pressure measurement.

31. The non-transitory computer readable medium of claim 29, wherein the determining the transpulmonary pressure value is based on:
- a ratio of total lung volume to total lung surface area;
- a ratio of the cubic root of the total lung volume and the square root of lung surface area; or
- a ratio of an intrapleural pressure and atmospheric pressure.

* * * * *